Jan. 15, 1929.
G. R. MAUPIN
1,699,003
APPARATUS FOR FINISHING ALIGNED CYLINDRICAL BEARING SURFACES
Filed Jan. 24, 1927    2 Sheets-Sheet 1
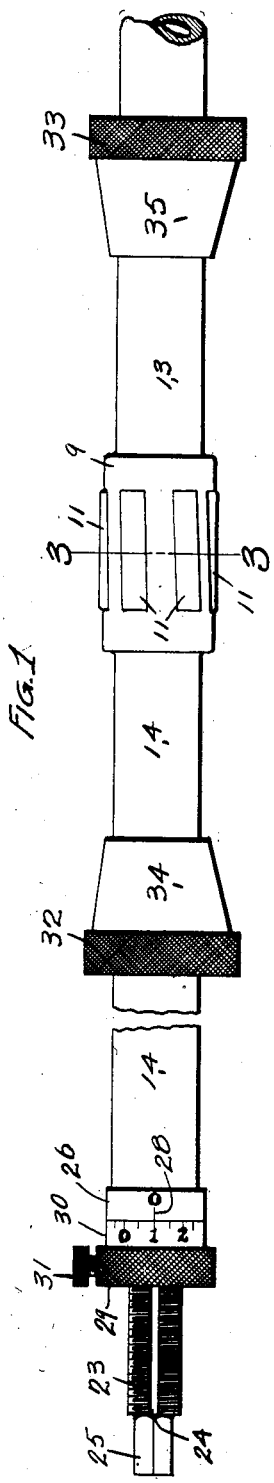
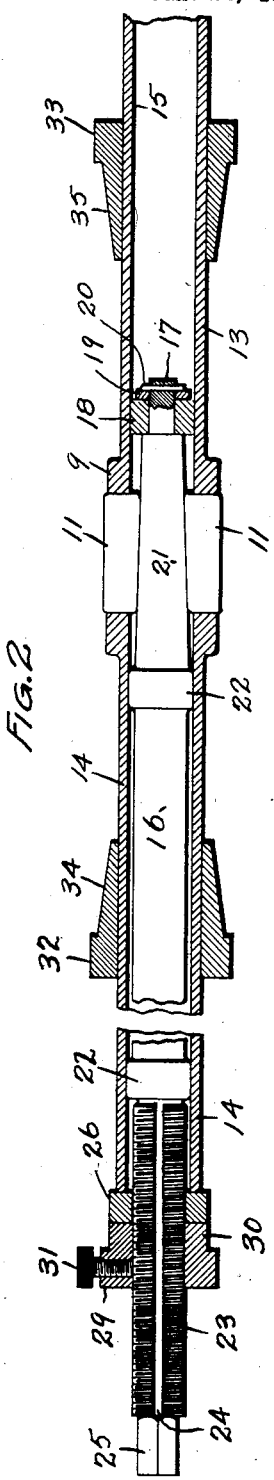
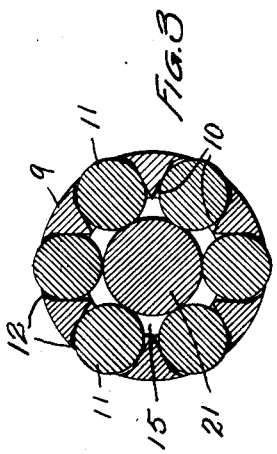
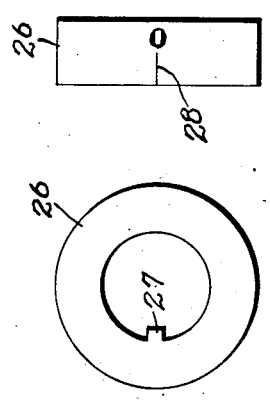
INVENTOR
GRAVES R. MAUPIN
BY Edwards & Logan
ATTY.

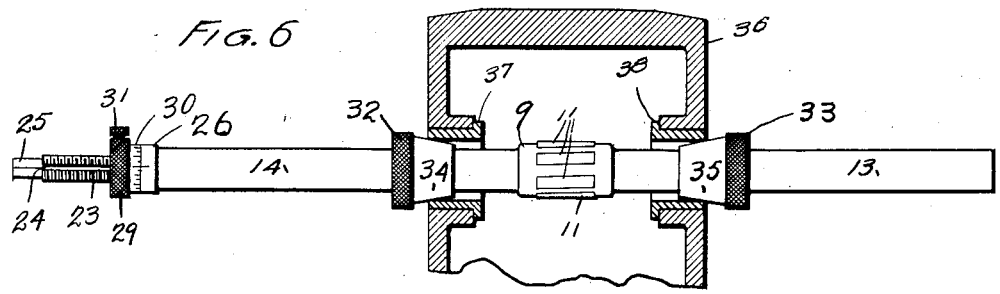
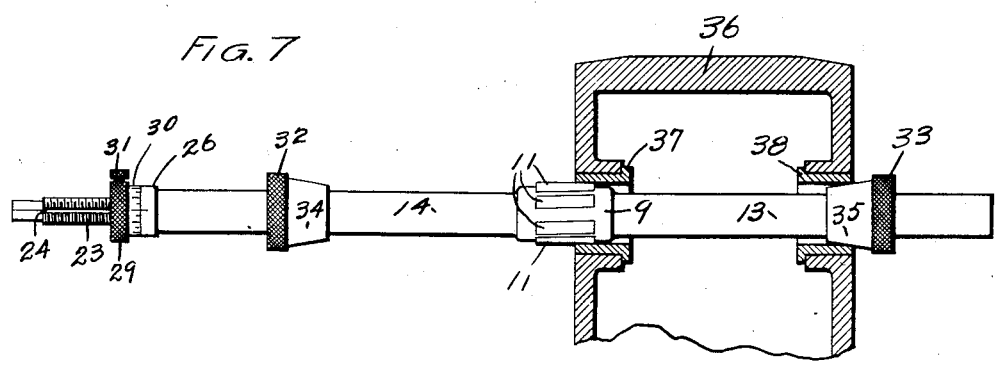
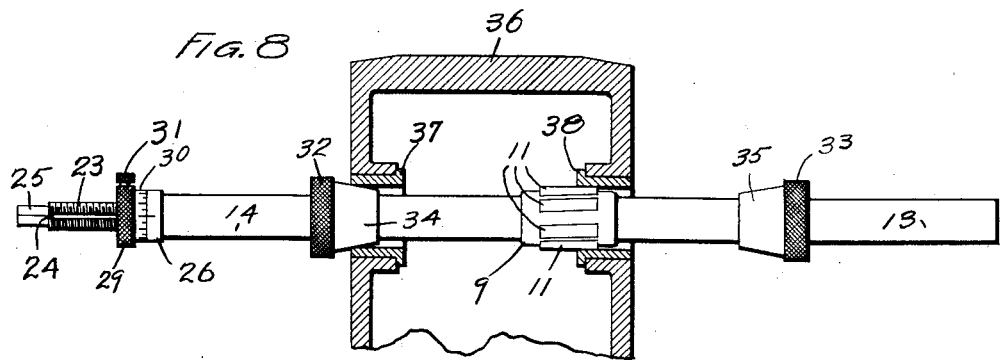

Patented Jan. 15, 1929.

1,699,003

UNITED STATES PATENT OFFICE.

GRAVES R. MAUPIN, OF MOBERLY, MISSOURI, ASSIGNOR TO THE J. FAESSLER MANUFACTURING COMPANY, OF MOBERLY, MISSOURI, A COPARTNERSHIP COMPOSED OF JOHN W. FAESSLER, CHRISTINIA FAESSLER, LOUIS E. FAESSLER, AND GRAVES R. MAUPIN.

APPARATUS FOR FINISHING ALIGNED CYLINDRICAL BEARING SURFACES.

Application filed January 24, 1927. Serial No. 163,210.

My invention relates to improvements in apparatus for and method of finishing aligned cylindrical bearing surfaces, and has for its primary object a device by means of which aligned cylindrical bearing surfaces can be finished.

A still further object is to construct a device by means of which cylindrical bearing surfaces, which are longitudinally spaced apart and which have a common center, can be finished in absolute alignment so that there will be no possible skewing of a member passed through the bearings.

A still further object is to construct a device which is provided with means whereby it can be absolutely centered between spaced apart cylindrical bearing surfaces so that when the same are finished the bearing surfaces will be in true alignment with each other.

A still further object is the method of the finishing aligned cylindrical bearing surfaces in which the surfaces of the bearing are finished in true alignment with each other and in which the metal of the bearing surface is compressed and toughened.

A still further object is the method of finishing aligned cylindrical bearing surfaces in which the surface is not only compressed and finished smoothly but which in addition thereto will tighten the bushings in all types of bearings without the use of hydraulic presses or the necessity of heating the various portions in which such bushings are inserted. This makes my device especially useful for securing bushings in pistons by a rolling process and similar articles in which it is necessary that the bores of said bushings have absolutely the same center and be in absolute alignment, for instance as in automobile engine pistons or for crank bearings for automobile crank shafts, and similar purposes, and in addition to securing these bushings in position the bearing surface is compressed and rendered extremely smooth so as to eliminate all grinding or working in.

This invention is an improvement on Letters Patent No. 1,619,479, issued to me March 1st, 1927, for method of and apparatus for finishing cylindrical bearing surfaces.

In the drawings:

Fig. 1 is a side elevation of my device with parts broken away;

Fig. 2 is a vertical longitudinal section of the same, the mandrel being shown in solid;

Fig. 3 is an enlarged cross section taken on the line 3—3 of Fig. 1;

Fig. 4 is an enlarged end view of the stationary collar employed;

Fig. 5 is an edge view of the same;

Fig. 6 is a diagrammatic view showing the initial position of my device as employed for finishing wrist pin bearings in the cylinder of an internal combustion engine;

Fig. 7 is a similar view showing the first step of rolling in and finishing the bearing; and Fig. 8 is a similar view showing the beginning of finishing aligned bearing surfaces.

In the construction of my device I employ a cage 9 which is provided with a plurality of openings 10. These openings extend radially and are designed to receive the rollers 11. It will be noted from Fig. 3 that the openings 10 have their upper edges 12 so constructed that the rollers cannot pass entirely through; in other words, drop out of the cage. Formed integral with the cage are guide stems 13 and 14. These stems as well as the cage are provided with a cylindrical bore 15 in which the mandrel 16 is inserted. The mandrel 16 is provided at one end with a reduced portion 17 on which is mounted a roller guide 18, the diameter of this guide being the same as the bore 15. The roller guide is secured on the reduced portion 17 by means of a washer 19 and a pin or cotter key 20. The mandrel 16 is provided adjacent the reduced cylindrical portion 17 with a tapered portion 21, which is designed to contact with the rollers 11, the rollers 11 being similarly tapered so that as they are projected radially from the casing their outer surface will be in horizontal alignment with or parallel to the axis of the mandrel.

To the rear of the tapered portion 21 I provide guide shoulders 22. These shoulders are spaced apart and fit snugly within the bore 15 so that no tilting of the mandrel can occur. The rear end of the mandrel is provided with a screw threaded portion 23 and with a keyway 24. A further extension of the mandrel beyond the screw threaded portion is provided with an angular portion 25. This angular portion is for the purpose of permitting it to be secured within the chuck of an air or electric tool, or for a wrench engaging surface.

Slidably mounted on the portion 23 is a collar 26 which is provided with a key 27 fitting in the key-way 24 so that the collar will rotate simultaneously with the mandrel. This collar also serves as a thrust collar as will be herein explained later. The collar 26 is provided on its surface with a line 28. Mounted on the screw threaded portion 23 of the mandrel is a screw threaded collar 29 which has a reduced portion 30. This reduced portion is provided with a scale so that the feed of the mandrel can be accurately adjusted. The screw threaded collar 29 is held against rotation on the screw threaded portion 23 of the mandrel by means of a set screw 31. Slidably mounted on the guide stems 13 and 14 are pilots 32 and 33. These pilots have tapered ends 34 and 35 respectively and are slidably mounted on the guide stems 13 and 14 in such a manner that they can readily slide thereon but still not allow any play. In fact the fit is what is mechanically termed "a running fit".

In Figs. 6, 7 and 8 I have illustrated a piston 36 which is provided with bushings 37 and 38, these bushings being diametrically opposite each other and designed to receive the wrist pin of the connecting rod, which connects the piston to the crank shaft of an automobile engine.

The operation of my device is as follows: When it is desired to roll aligned bearings, such as illustrated in Figs. 6, 7 and 8, the first step will be to place the bearings in position. These bearings, as described in my previous application, are preferably of such a size on their outside that they can be readily pushed into their seats. The tool is then inserted as illustrated in Fig. 6 with the cage between the two bearings. The pilots are then pushed into the bearings as illustrated in Fig. 6, these bearings have been previously bored out. The next step is to draw the entire device toward the left so that the rollers 11 will enter the bore of the bearing 37. The mandrel is then pushed forward so that the rollers will exert a slight frictional contact with the interior of the bearing 37, after which the collar 26 is pushed forward, and the collar 29 screwed up on the mandrel until it contacts with the collar 26. This will center the cage in the bearing 37.

The pilot 32 is then withdrawn from the bearing 37 and the mandrel pulled still farther to the left until it assumes the position indicated in Fig. 7. When in this position the rollers 11 will bear against the bearing and prevent any tilting of the mandrel on that side while the pilot 33 is still in the bushing 38. The collar 29 is then screwed back slightly from the collar 26 and the device is ready for operation.

A suitable tool is placed or secured to the end 25 for rotating the mandrel, and upon its rotation the mandrel is fed forward by reason of the rollers 11 being arranged at an angle to the longitudinal axis of the cage causing the rollers to expand and to bite against the surface of the bearing. As soon as the collar 29 contacts with the collar 26, which abuts against the end of the guide stem 14, all further feeding of the mandrel ceases: consequently halting the outward thrust of the rollers. Then due to their inclination they will gradually feed through the bushing 37 simultaneously expanding and seating it in the bore in which it was inserted and compressing its bearing surface. This rotation is continued until the cage has passed entirely through this bearing bringing it again into the position indicated in Fig. 6. The pilot 32 is then pushed into the bearing 37 again aligning the guide stem, the mandrel withdrawn slightly so as to permit the rollers to collapse and the cage pushed into the bushing 38 as illustrated in Fig. 8. The mandrel is then pushed forward so as to expand these rollers and given a few turns so as to cause them to bind tightly, after which the pilot 33 is moved out of the bushing 38 as illustrated in Fig. 8. It is now only necessary to rotate the mandrel to finish the other bearing, that is, the bushing 38. In this way my device is held in absolute alignment on account of the tapered or conical portions on the pilots, the guide stems and cage will always be centered exactly, and by reason of expanding the rollers, so that they have bearing in the bushings before removing the pilots, no tilting can occur.

It is of course to be understood that after the finishing tool has been passed through the bearings the operation is repeated, that is, the device is first centered as illustrated in Fig. 6 and the subsequent operations are followed for each increase in diameter of the bearing surfaces until the finish size has been reached.

I am therefore enabled by means of my apparatus and method to finish cylindrical bearing surfaces in absolute alignment with each other and while so doing not only tighten up bushings, which form the cylindrical bearing surface, but also toughen the wearing surface of the said bearing. In addition to this it is also possible by the use of a lubricant, which is necessary in finishing these bearings, to force it into the surface of the bearing and in this way prevent the heating up of the bearing surface because the lubricant, which has been forced into the metal, will assist in preventing this heating.

While I have shown my device applied to finishing two cylindrical bearings, I do not desire to limit myself thereto as it is possible by my structure to finish any number of bearings in alignment, nor do I desire to restrict myself to the number of rollers disclosed in my application because the number of rollers employed will depend entirely upon the diameter of the cylindrical bearing being finished; a small bearing requiring fewer rollers in the cage than a large bearing.

It will be noted that on the collar 26 I have only the graduation 28, while on the portion 30 I have various graduations. This enables me to have a micrometer adjustment as to the diametrical expansion of the roller 11, this diametrical expansion being regulated by the pitch of the screw threads on the portion 23 and the tapered portion 21. In other words, I can adjust my device by reason of these screw threads and taper so that when the portion marked O on the collar 30 is in alignment with the portion marked O, and it is desired to increase the diameter of the bore one one-thousandth of an inch, the screw 31 is loosened and the collar rotated backward, that is toward the portion 35 sufficient to bring the line marked 1 in alignment with the portion marked O on the collar 26. Then by rotating the mandrel in the direction to feed it forward and by reason of the inclination of the rollers the diameter of the surface finished by the rollers will be increased one one-thousandth of an inch. Of course this increase in diameter can be regulated to suit various requirements, the pitch of the screw threads on the portion 23 of the mandrel and also the taper of the portion 21 of the mandrel being taken into consideration as they must work together to accomplish this purpose. In fact I obtain what may be virtually termed a micrometer adjustment for the increase in diameter finished by the rollers 11.

Having fully described my invention, what I claim is:—

1. An apparatus for finishing cylindrical aligned bearing surfaces comprising a cage, rollers carried by said cage and adapted to be projected radially therefrom, a hollow guide stem projecting from each end of said cage and in axial alignment therewith, pilots slidably mounted on said guide stems, and a mandrel extending through one of said guide stems and the cage, means for supporting said mandrel in said guide stems, and contacting with said rollers for projecting a portion of said rollers beyond the periphery of the cage.

2. An apparatus for finishing aligned cylindrical bearing surfaces comprising a cage, rollers carried by said cage and adapted to be projected radially therefrom, a hollow guide stem projecting from each end of said cage and concentric therewith, a pilot having a tapered end slidably mounted on each of said guide stems, a mandrel extending through one of said guide stems and beyond the cage and adapted to contact with the periphery of said rollers for projecting a portion of said rollers beyond the periphery of said cage, and means located within the other hollow guide stem for supporting the end of said mandrel.

3. An apparatus for finishing aligned cylindrical bearing surfaces comprising a cage, rollers carried by said cage and adapted to be projected radially beyond the periphery of said cage, a guide stem projecting from each end of said cage, means carried by each of said guide stems for centering the same in a cylindrical bore, a mandrel extending through one of said guide stems and the cage and arranged adjacent its end to contact with and project said rollers beyond the periphery of the cage, and means for supporting the end of said mandrel adjacent the rollers.

4. An apparatus for finishing cylindrical aligned bearing surfaces comprising a cage, rollers carried by said cage and adapted to be projected radially therefrom, a hollow guide stem projecting from each end of said cage, pilots slidably mounted on said guide stems, a mandrel extending through one of said guide stems and the cage and adjacent its ends contacting with said rollers for projecting a portion of said rollers beyond the periphery of the cage, rotatable means for supporting the end of said mandrel adjacent the rollers, and means carried by said mandrel for limiting the depth of insertion thereof in said guide stem.

5. An apparatus for finishing aligned cylindrical bearing surfaces comprising a cage, rollers carried by said cage and adapted to be projected radially therefrom, a hollow guide stem projecting from each end of said cage and concentric therewith, a pilot having a tapered end slidably mounted on each of said guide stems, a mandrel extending through one of said guide stems and the cage and adapted adjacent its ends to contact with the periphery of said rollers for projecting a portion of said rollers beyond the periphery of said cage, rotatable means slidably mounted in one of said guide stems for supporting the end of said mandrel, and means carried by the mandrel and adapted to contact with the end of said guide stem for limiting the depth of insertion of the mandrel whereby the amount of projection of said rollers is regulated.

6. An apparatus for finishing aligned cylindrical bearing surfaces comprising a cage, rollers carried by said cage and adapted to be projected radially therefrom, hollow guide stems concentric with and projecting from the ends of said cage, pilots slidably mounted on said guide stems for centering the same in a cylindrical bore, a mandrel extending through one of said guide stems and cage, said mandrel adapted to project the rollers radially and beyond the periphery of the cage, guides integral with said mandrel for centering the same within one of said guide stems and cage, a guide rotatably carried by the end of said mandrel and located in the other of said guide stems, and means carried by the mandrel and adapted to contact with the end of one of said guide stems for limiting the depth of insertion of the mandrel.

In testimony whereof I have affixed my signature.

GRAVES R. MAUPIN.